United States Patent [19]

Pober et al.

[11] Patent Number: 5,405,916
[45] Date of Patent: Apr. 11, 1995

[54] PROCESS FOR THE PREPARATION OF POLYOLEFIN/ACRYLONITRILE COPOLYMERS AND POLYOLEFIN/ACRYLIC ACID OR SUBSTITUTED ACRYLIC ACID/ACRYLONITRILE TERPOLYMERS

[75] Inventors: Kenneth W. Pober; Charles M. Starks, both of Ponca City, Okla.

[73] Assignee: Conoco Inc., Ponca City, Okla.

[21] Appl. No.: 141,841

[22] Filed: Oct. 22, 1993

Related U.S. Application Data

[62] Division of Ser. No. 781,791, Oct. 23, 1991, Pat. No. 5,284,924.

[51] Int. Cl.[6] ............................................. C08F 8/30
[52] U.S. Cl. ................................. 525/329.9; 44/384; 44/393; 44/394; 525/377; 525/418; 528/362; 528/363; 252/50
[58] Field of Search ................... 525/377, 329.9; 528/362, 363

[56] References Cited

U.S. PATENT DOCUMENTS 2,377,795  6/1945  Loder .
3,841,850  10/1974  Aaron et al. .................... 44/393
4,926,582  5/1990  Motz et al. ...................... 44/62

OTHER PUBLICATIONS

"Nitrile Synthesis Via the Acid-Nitrile Exchange Reaction", by David A. Klein, J. Org. Chem., vol. 36, No. 20, 1971, pp. 3050-3051.

Primary Examiner—Fred Zitomer
Attorney, Agent, or Firm—C. R. Schupbach

[57] ABSTRACT

Terpolymers of polyolefin/acrylic acid or substituted acrylic acid/acrylonitrile are prepared by combining a polyolefin/acrylic acid or substituted acrylic acid copolymer with at least one dinitrile to form a mixture and reacting the mixture at a temperature of at least 200° C. for a time sufficient to form the terpolymer. Copolymers of polyolefin/acrylonitrile are obtained when the reaction is carried to completion. The total reaction masses obtained comprising terpolymer or copolymer, cyclic imide, solvent, when used, and any unreacted dinitrile find use as pour point depressants in heavy hydrocarbon oils.

36 Claims, 1 Drawing Sheet

PROCESS FOR THE PREPARATION OF POLYOLEFIN/ACRYLONITRILE COPOLYMERS AND POLYOLEFIN/ACRYLIC ACID OR SUBSTITUTED ACRYLIC ACID/ACRYLONITRILE TERPOLYMERS

This is a division of application Ser. No. 07/781,791, filed Oct. 23, 1991, now U.S. Pat. No. 5,284,924.

BACKGROUND OF THE INVENTION

It is known that polyethylene/acrylonitrile copolymer is a very effective pour point depressant for a range of crude oils. While polyethylene/acrylonitrile copolymer shows good pour point depressant performance, the problem has been with the manufacture of the copolymer. Until now, there has been no high yield low cost convenient one step route to the polyethylene acrylonitrile copolymer.

Polyethylene/acrylonitrile copolymer can be made by the copolymerization of ethylene and acrylonitrile. However the reaction conditions are extreme and acrylonitrile itself is relatively toxic. For example, in Germany, polyethylene/acrylonitrile copolymer has been made directly from the monomers ethylene and acrylonitrile at a temperature of 230° C. and 27,000 pounds per square inch pressure.

It would be desirable to provide a process for the manufacture of polyethylene acrylonitrile copolymer which could be carried out in a single step at atmospheric pressure or low pressures.

Prior Art

U.S. Pat. No. 2,377,795 to Loder discloses the preparation of adiponitrile by reaction of acetonitrile and adipic acid at temperatures between 225° C. and 300° C. and pressures from 50 atmospheres to about 500 atmospheres.

U.S. Pat. No. 3,841,850 to Aaron et al discloses pour point depressant copolymers of 82 to 90 mole percent ethylene with certain substituted ethylenes of 3 to 40 carbon atoms which have less than 18 carbon atoms in any linear side chain. Acrylic acid is disclosed as one of the substituted ethylenes. The pour point depressant copolymers are prepared at temperatures between 40° C. and 300° C. and pressures between 900 and 40,000 psig.

U.S. Pat. No. 4,926,582 to Motz et al discloses use of oil soluble ethylene/acrylonitrile copolymers or terpolymers as pour point depressants. The ethylene/acrylonitrile copolymers are prepared by polymerization of ethylene and acrylonitrile or by reacting acrylic acid with ethylene and pyrolyzing with ammonia to obtain the copolymer.

"Nitrile Synthesis Via the Acid-Nitrile Exchange Reaction", by David A. Klein, J. Org. Chem., Vol 36, No. 20, 1971 pages 3050–3051, discloses a process for making nitriles in high yields by reacting carboxylic acids with short chain dinitriles (specifically, succinonitrile, glutaronitrile, and alpha methylglutaronitrile). The reference states that the reaction is driven to completion since the cyano acid formed as a by-product undergoes an internal cyclic imide formation, removing it from the equilibrium. The reaction is carried out at 150° C. to 300° C. without the use of pressure equipment and may be catalyzed by the addition of a small amount of acid catalysts such as sulfonic, sulfuric or phosphoric acids or their various salts.

The Invention

In carrying out the process of the invention, a copolymer of an olefin and an acrylic acid or substituted acrylic acid is reacted with at least one dinitrile having the formula NC—$C_n$—CN where n=2 to 4 and C is branched or straight chain alkyl at a temperature of at least 200° C. for a time sufficient to form polyolefin/acrylonitrile copolymer.

In one aspect of the invention, where the reaction is not taken to completion, a polyolefin/acrylic acid or substituted acrylic acid/acrylonitrile terpolymer is formed.

The reaction may be carried out in the presence of an acid catalyst. The reaction may also be carried out in a high boiling point aromatic solvent.

DETAILED DESCRIPTION OF THE INVENTION

Figure 1:
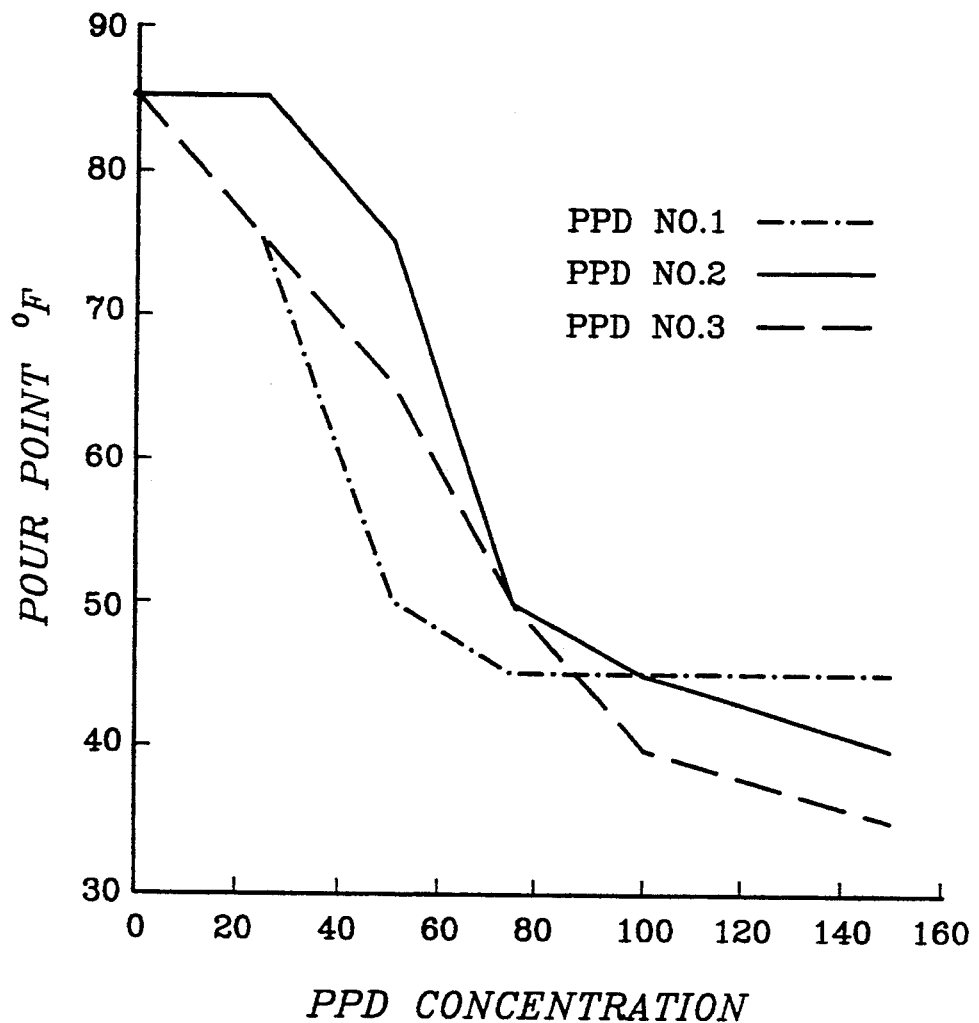
FIG. 1 is a graph of crude oil pour point versus pour point depressant concentration of several pour point depressants in the crude oil.

In carrying out the process of the invention, the reactants are placed in a suitable reaction vessel, heated to reaction temperature and held at that temperature for a sufficient time period to convert the reactants to the desired copolymer or terpolymer. The polyolefin portion of the polyolefin/acrylic acid or substituted acrylic acid copolymer feed to the reaction is formed from monomers selected from the group consisting of $C_2$ to $C_{20}$ alpha olefins and styrene and styrene derivatives having the formula:

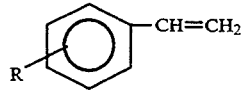

where R=$CH_3$, $C_2H_5$, $C_3H_8$, $C_4H_9$, Cl, Br, $COCH_3$ and $OCH_3$

Examples of suitable monomers include ethylene, propylene, 1-butene, 1-hexene, 1-octene, 1-decene, 1-dodecene, 1-docosene, styrene, p-methylstyrene, p-tert-butyl styrene, butadiene and isoprene.

The acid portion of the copolymer reactant is formed from acids selected from the group having the formula:

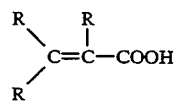

where R=H, phenyl, $C_1$ to $C_5$ alkyl

Suitable examples of these acids include acrylic acid, methacrylic acid, 3,3-dimethylacrylic acid, 3,3-dimethylmethacrylic acid, crotonic acid, and cinnamic acid.

The copolymers may vary over a wide range of molecular weight, from as low as 2000 or 3000 to as high as 200,000 or more. Usually the molecular weight will vary from about 15,000 to about 100,000, with better pour point depressant products being obtained with the lower molecular weight copolymers.

The polyolefin/acrylic acid or substituted acrylic acid copolymer will usually contain from about 10 to about 25 weight percent of the acid depending on the composition of the copolymer. With a copolymer of polyethylene and acrylic acid, the optimum weight percent of acid in the copolymer is usually about 20 percent to provide the most effective pour point depressant product.

In the process of the reaction of the copolymer with a dinitrile to form the acrylonitrile copolymer or terpolymer, a cyano acid is formed as a by-product of the reaction. This cyano acid undergoes an internal cyclic imide formation which removed it from the equilibrium, thus driving the reaction to completion. The dinitriles which are used in the process invention and form such acids have the formula:

$$NC-C_n-CN$$

where n=2 to 4 and C is branched or straight chain alkyl.

Examples of such dinitriles include glutaronitrile, 2-methylglutaronitrile, succinonitrile and adiponitrile.

It is convenient to use the normally solid polyolefin-/acrylonitrile copolymers as pour point depressants in the liquid state. For this reason, among others, the process of the invention is preferably carried out in a solvent to provide a product which can be used "as is" that is without the addition of a solvent. A solvent is also desirable since it serves to maintain the reaction mixture in a liquid state during the reaction, which facilitates contact of the reactants, and also aids in mixing the reactants. When a solvent is used in the process, the product obtained is usually liquid at ambient temperature at up to 10 percent polyolefin/acrylonitrile polymer solids. From 10 to 30 percent polymer solids the finished product ranges from a soft to a stiff gel which may readily be remelted with heat.

The solvents employed in the process are those which are inert to the reaction and have a boiling point above the reaction temperature. Preferred are aromatic solvents containing at least about 75 percent $C_9$ and $C_{15}$ aromatic hydrocarbons and more preferably from about $C_{10}$ to $C_{12}$ aromatic hydrocarbons. These solvents typically have a boiling point at atmospheric pressure above 250° C. Typical examples of suitable solvents include biphenyl, bibenzyl, phenanthrene and anthracene. If desired, a refinery stream high in aromatics such as ethylene cracker bottoms may also be used as the solvent.

While the process is preferably carried out at atmospheric pressure to avoid the use of pressure vessels, it is possible to use pressures somewhat above atmospheric if desired. At such pressures above atmospheric, the boiling point of other aromatic compounds is increased to a level above the reaction temperature. At such higher pressures e.g. up to about 300 psig other aromatic solvents such as toluene, xylene, ethylbenzene, cumene, paracymene, and naphthalene may be used in the process.

The solvent will usually comprise from about 70 to about 95 weight percent of the total reaction system, and more usually between about 85 and about 92 weight percent.

The process is carried out at a reaction temperature of at least 200° C., preferably at least 225° C. and more preferably at least 235° C. The time of reaction is sufficient to complete the reaction to obtain the desired polymer product. The time of reaction will usually range from about 20 to 60 hours with shorter times being required at the higher temperatures. When the starting copolymer is a polyethylene/acrylic acid copolymer, the temperature employed in the process to obtain a product with maximum pour point depressant properties is at least 235° C. and preferably from 235° C. to about 245° C. and with the reaction being carried out for a time period of 21 to 24 hours.

Although it is not necessary, the process may be carried out in the presence of an acid catalyst. When a catalyst is employed, the products obtained are the same as those resulting from the noncatalytic process. The catalytic reaction may be carried out with or without a solvent, however, a solvent is preferred for the reasons given previously. Usually the amount of catalyst used is very small ranging from as low as 0.1 to as high as 1.0 percent by weight of the total reaction system. Normally there is no need to remove the catalyst from the reaction products. However, if removal is desired or should become necessary, it may be effected by extraction of the reaction mass with aqueous caustic or the equivalent.

A variety of acid catalysts may be used in the process including mineral acids such as phosphoric acid, hydrochloric acid, phosphorous acid, fluorosulfonic acid and chlorosulfonic acid. Also useful are organic acids such as benzene sulfonic acid, methane sulfonic acid, p-toluene sulfonic acid, p(n-dodecyl-benzene sulfonic acid, alkyl sulfonic acids having the formula:

$$R-SO_3H$$

where $R=C_1-C_{12}$ alkyl groups
and alkyl phosphonic acids having the formula:

$$\begin{matrix} & O \\ & \| \\ R- & P-OH \\ & | \\ & OH \end{matrix}$$

where $R=C_1-C_{12}$ alkyl groups and other phosphonic acids, such as 1-hydroxyethylidene-1,1-diphosphonic acid, amino tri (methylene phosphonic acid) and ethylenediamine tetra (methylene phosphonic acid).

When a catalyst is employed in the process the process may be carried out at lower temperatures or for a shorter time period to obtain the desired products.

The process of the invention may be used to prepare polyolefin/acrylonitrile copolymers or terpolymers of polyolefins, acrylic acid or substituted acrylic acids and acrylonitrile. Usually the conversion of the polyolefin-/acid copolymer will be at least 75 percent and more usually 85 to 95 percent under the reaction conditions described. The percent conversion is related to the time period over which the reaction is carried out, the amount of dinitrile present in the reaction mass, and the reaction temperature. When the reaction is carried out to completion, the resulting product is a polyolefin/acrylonitrile copolymer. If the reaction is not carried to completion, the product is a terpolymer of olefin, acrylic acid or substituted acrylic acid and acrylonitrile. The percentage of acrylic acid or substituted acrylic acid in the terpolymer product may be varied by the temperature and time of the reaction or by limiting the amount of dinitrile used in the process. If the purpose of the reaction is to produce the polyolefin/acrylonitrile copolymer, at least a stoichiometric amount of the dinitrile (1:1 stoichiometric ratio) is required in the process and preferably the process is carried out with an excess of dinitrile up to 25 percent or more in excess of stoichiometric. If desired of course, larger amounts of the dinitrile may be used in the process.

The preferred reactants in the process are polyethylene/acrylic acid copolymer containing about 20 weight percent acrylic acid and alpha methylglutaronitrile. The co-product of this reaction is 3-methylglutarimide.

The reaction products of the process of the invention may be used as pour point depressants in various heavy hydrocarbon oils, including shale oils, crude oils, residua containing fuels and distillate fuels. Residua containing fuels are fuels comprising residua from the distillation of crude oil or shale or mixtures thereof. Flash distillate fuels are those fuels obtained by the flashed distillation at reduced pressure of residual oils. Although the reaction products may be used as pour point depressants in any crude oils, they are particularly effective with high pour point waxy crude oils. They find particular application in waxy crude oils obtained from areas such as India, Egypt and the British North Sea.

It has been found that the products of the process of the invention may be used "as is" without any treatment of the reaction mass. Thus, it is not necessary to separate out the copolymer or terpolymer product from the reaction mass. The entire reaction mass of copolymer or terpolymer, solvent, imide and any unreacted dinitrile may be used directly as a pour point depressant in heavy hydrocarbon oils. Usually it is also unnecessary to remove the acid catalyst from the reaction mass when such a catalyst is used because the amount of catalyst required is so small.

If removal of the copolymer or terpolymer product from the reaction mass is desired, it may be effected by extraction of the reaction mass with a suitable solvent. In one extraction procedure, methanol or acetone solvent is used in an amount equal to between 5:1 and 10:1 ratio based on the total reaction products. The reaction products are added slowly to rapidly stirred solvent at ambient temperature. Solids precipitate quickly and are collected by filtration. The solids are then dried in a vacuum oven to provide the polymer product. If one precipitation is not sufficient, the polymer solids may be redissolved in an aromatic hydrocarbon solvent and the above process repeated.

The following examples are presented in illustration of the invention.

Example 1

A number of runs were carried out at atmospheric pressure in which an ethylene/acrylic acid copolymer, a dinitrile and an aromatic solvent were introduced to a reaction flask. In each run stirring and heating were started after the ingredients had been charged to the flask. The temperature was raised to the desired reaction temperature over a period of 1 to 2 hours and was continued at that level for the desired reaction time period. The reaction mixture was then cooled and was used directly as a finished product. There was no attempt made to separate the polymer produced in the reaction from the imide, unreacted dinitrile, or from the catalyst in those runs in which a catalyst was employed. The various reaction conditions and the quantities of starting materials used are set forth in Table 1. This table also includes pour point depressant performance results in crude oil for each of the reaction masses obtained in the runs.

TABLE 1

| Run # | EAA Polymer | Nitrile | Aromatic Solvent | Catalyst | Reaction Temp °C. | Time Hrs. | Pour Point Depressant Perfromance Results Pour Point °F. |
|---|---|---|---|---|---|---|---|
| 1 | 20% AA 15 g | MGN 50 g | 135 g | $H_3PO_4$ 1.0 g | 230 | 24 | PPM 100 250 // 25 50 75 100* Pour Pt. 50 40 // 65 60 50 45 |
| 2 | 20% AA 10 g | MGN 33 g | 90 g | $H_3PO_4$ 0.7 g | 239 | 22 | PPM 100 250 // 25 50 75 100* Pour Pt. 50 40 // 80 65 45 40 |
| 3 | 20% AA 15 g | GN 4.7 g | 135 g | $H_3PO_4$ 0.8 g | 234 | 22 | PPM 100 250 // 25 50 75 100* Pour Pt. 40 40 // 80 65 50 50 |
| 4 | — | MGN 33.6 | 90 g | $H_3PO_4$ 0.7 g | 235 | 21 | PPM 100 250 Pour Pt. 85 85 |
| 5 | 20% AA 10 g | MGN 33 g | 90 g | — | 239 | 22 | PPM 50 100 Pour Pt. 75 65 |
| 6 | 20% AA 10 g | SN 2.4 | 90 g | $H_3PO_4$ 0.5 g | 240 | 21 | PPM 50 100 Pour Pt. 75 65 |
| 7 | 20% AA 10 g | MGN 33 g | 90 g | — | 240 | 21 | PPM 50 100 Pour Pt. 65 55 |
| 8 | 20% AA 10 g | MGN 33 g | 90 g | — | 235 | 24 | PPM 50 100 // 25 50 75 100* Pour Pt. 75 55 // 70 55 50 45 |
| 9 | 20% AA 10 g | MGN 3.6 g | 90 g | — | 242 | 23 | PPM 50 100 Pour Pt. 60 55 |
| 10 | 20% AA 10 g | MGN 1.8 g | 90 g | — | 242 | 23 | PPM 50 100 Pour Pt. 85 85 |
| 11 | 20% AA 10 g | MGN** 33 g | 90 g | — | 241 | 24 | PPM 50 100 Pour Pt. 85 55 |
| 12 | 20% AA 10 g | MGN 3.6 g | 90 g | — | 242 | 12 | PPM 50 100 Pour Pt. 80 80 |
| 13 | 20% AA 10 g | MGN 3.6 g | 90 g | — | 243 | 6 | PPM 50 100 Pour Pt. 85 80 |
| 14 | 20% AA 10 g | MGN 3.6 g | 90 g | — | 242 | 24 | PPM 50 100 Pour Pt. 70 50 |
| 15 | 20% AA 10 g | MGN 3.6 g | 90 g | — | 243 | 24 | PPM 50 100 // 50 100 // 25 50 75 100*** Pour Pt. 55 55 // 75 50 // 80 75 60 50 |
| 16 | 20% AA 10 g | MGN 3.6 g | 90 g | — | 241 | 3 | PPM 50 100 Pour Pt. 80 80 |
| 17 | 20% AA 10 g | MGN 3.6 g | 90 g | — | 225 | 24 | PPM 50 100 // 50 100* Pour Pt. 80 65 // 80 80 |
| 18 | 15% AA 10 g | MGN 5 g | 120 g | — | 238 | 23 | PPM 50 100 // 50 100* Pour Pt. 85 75 // 80 75 |
| 19 | 10% AA | MGN | 120 g | — | 242 | 24 | PPM 50 100 |

TABLE 1-continued

| Run # | EAA Polymer | Nitrile | Aromatic Solvent | Catalyst | Reaction Temp °C. | Time Hrs. | Pour Point Depressant Perfromance Results Pour Point °F. |
|---|---|---|---|---|---|---|---|
| 20 | 10 g 15% AA | 5 g MGN | 120 g | — | 240 | 24 | Pour Pt. 85 85<br>PPM 50 100 // 50 100 // 25 50 75 100*** |
| 21 | 10 g 10% AA | 5 g MGN | 120 g | — | 242 | 24 | Pour Pt. 85 75 // 80 65 // 80 80 80 60<br>PPM 50 100 |
| 22 | 10 g 20% AA | 5 g MGN | 120 g | — | 241 | 24 | Pour Pt. 85 85<br>PPM 50 100 // 50 100 // 25 50 75 100*** |
| 23 | 10 g 20% AA | 5 g MGN | 120 g | — | 239 | 24 | Pour Pt. 80 75 // 60 50 // 75 55 50 50<br>PPM 50 100 // 50 100 // 25 50 75 100*** |
| 24 | 10 g 20% AA | 5 g MGN | 120 g | — | 241 | 24 | Pour Pt. 80 75 // 55 55 // 70 65 50 50<br>PPM 50 100 // 25 50 75 100* |
| 25 | 10 g 20% AA | 5 g MGN | 120 g | — | 241 | 43 | Pour Pt. 55 40 // 65 50 50 45<br>PPM 50 100 // 15 30 45 60 76* |
| 26 | 40 g 20% AA | 20 g MGN | 120 g | — | 234 | 24 | Pour Pt. 45 // 80 65 55 50 50<br>PPM 50 100 |
| 27 | 10 g 20% AA | 5 g MGN | 120 g | — | 241 | 48 | Pour Pt. 55 50<br>PPM 50 100 |
| 28 | 10 g 20% AA | 10 g MGN | 120 g | — | 241 | 24 | Pour Pt. 50 45<br>PPM 50 100 |
| 29 | 10 g 20% AA | 10 g MGN | 120 g | p-TSA 0.75 g | 242 | 23 | Pour Pt. 60 50<br>PPM 50 100 |
| 30 | 10 g 20% AA | 5 g MGN | 120 g | MSA 0.5 g | 242 | 24 | Pour Pt. 50 45<br>PPM 50 100 |
| 31 | 10 g 20% AA | 5 g MGN | 2016 g | — | 241 | 24 | Pour Pt. 50 45<br>PPM 50 100 |
| 32**** | 168 g 20% AA 327 lbs. | 84 g MGN 171 lbs. | 2825 lbs. | — | 250 | 24 | Pour Pt. 80 50<br>PPM 50 100<br>Pour Pt. 45 50 |

Legend for Table 1
— MGN Alpha methylglutaronitrile
AA acrylic Acid
p-TSA p-Toluene Sulfonic Acid
EAA Polyethylene/Acrylic Acid Copolymer
SN Succinonitrile
MSA Methane Sulfonic Acid
GN Glutaronitrile
*Two groups of tests were carried out at different times
**A different grade of MGN was used in this run
***Three groups of tests were carried out at different times
****Pilot Plant Run The pour points of the reaction products were obtained in Bombay High South Crude having an API gravity of 38.8, a cloud point of 85°–88° F., a pour point of 85° F. and wax content of 11.6% at 0° C. and 19.0% at −30° C. The pour point of the crude without the addition of any reaction product was 80° to 85° F. As stated previously, no attempt was made to separate out copolymer or terpolymer from the reaction mass, nor was there any attempt to remove catalyst or any unreacted nitrile.

Acid catalysts were used in a number of the runs, i.e. Runs 1 to 4, 6, 29 and 30. With the exception of Run 4, the pour point depressant performance was good for the reaction masses of all of these runs. The reaction masses obtained without the use of a catalyst were also very effective pour point depressants, e.g. Runs 5, 7 to 9, 11, 14, 15, 22 to 28, 31 and 32.

In most of the runs a minimum of 1:1 mole ratio of alphamethyl glutaronitrile to polyethylene/acrylic acid copolymer was employed. In a number of runs, an excess ranging from 1.4 to 14 mole ratio was used. When a substantially lesser amount of alphamethyl glutaronitrile is used in the reaction, the pour point depressant performance result is usually poor. This is illustrated by Run 10 where the ratio was 0.50 to 1.

Reaction temperatures generally varied from 238° C. to 242° C. One test (Run 17) was carried out at 225° C. and the pour point depressant results were poor. The majority of the tests were made using a copolymer containing 20% acrylic acid. In runs 18, 19, 20 and 21 the copolymers contained 15%, 10%, 15% and 10% acrylic acid respectively. In each of these runs, the pour point depressant results were generally poor.

The reaction times employed usually were from 21 to 24 hours, however in a few runs higher reaction times were used. In three runs, 13, 14 and 17, substantially shorter reaction times were used. In each instance the pour point performance of the reaction mass was poor.

Example 2

Two runs were carried out using the same procedure as in Example 1 in which an aromatic solvent was not used in the reaction of ethylene/acrylic acid copolymer and dinitrile. Instead, an excess of 2-methylglutarolnitrile was used, in a molar ratio of about 46 to 1. Thus the 2-methylglutaronitrile in effect acted as a solvent as well as reactant. Pertinent data relating to the two runs is contained in Table 2.

TABLE 2

| Run # | EAA Polymer | Nitrile | Solvent | Catalyst | Temp °C. | Time Hrs. | Pour Point Depressant Performance Results Pour Pt. °F. |
|---|---|---|---|---|---|---|---|
| 1 | 20% AA | MGN | Excess | — | 250 | 18 | PPM 100 250 |

TABLE 2-continued

| Run # | EAA Polymer | Nitrile | Solvent | Catalyst | Temp °C. | Time Hrs. | Pour Point Depressant Performance Results Pour Pt. °F. | | |
|---|---|---|---|---|---|---|---|---|---|
| 2 | 10 g 20% AA 10 g | 166.2 g MGN 166.2 g | MGN Excess MGN | 85% H₃PO₄ 1.1 g | 250 | 16 | Pour Pt. PPM* Pour Pt. PPM** Pour Pt. | 40 100 50 100 50 | 35 250 45 250 45 |

*Amorphous
**Needles

A dark black reaction mass was obtained in Run 1. This mass was cooled during which solids separated from the reaction mass; which solids were filtered to recover polymer product. The polymer product was dissolved in an aromatic solvent and then tested for pour point depressant properties in Bombay High South crude. It is noted from the table that the polymer product showed very good pour point depressant properties.

The reaction mass obtained in Run 2 was treated in a similar manner to isolate polymer solids. In this instance, two types of polymer solids were obtained, one was a crude amorphous type material and the other needlelike solids. Both of these solids were dissolved in aromatic solvents and tested for pour point depressant properties in Bombay High South crude. It is noted from the table that both polymer products provided good pour point depressant results.

Example 3

A pour point depressant was prepared using the same procedure set forth in Example 1. 10.0 grams of polyethylene/acrylic acid copolymer containing 20% acrylic acid was reacted with 4.6 grams of alphamethylglutaronitrile in 90.0 grams of aromatic solvent at atmospheric pressure and a temperature of 242° C. for 24 hours. Pour point depressant performance was obtained for the entire reaction mass in Bombay High South crude. For comparison, two commercial pour point depressants were also tested in the same crude. The results of the tests are shown in FIG. 1 in which pour point depressant No. 1 is the total reaction mass obtained by the process of the invention, and pour point depressants Nos. 2 and 3 are the commercial pour point depressant materials.

Satisfactory pour point performance is frequently determined in the range of 50° to 65° F. It is noted that in this range, the pour point performance of the reaction mass obtained by the process of the invention is substantially better than the commercial pour point depressants in terms of the amount of pour point depressant material required to obtain the desired pour point.

Example 4

In several of the runs made in Example 1, the reaction product was processed by solvent precipitation to separate out polymer products. The separated polymer was then analyzed to determine the percent conversion of carboxyl in the starting copolymer reactant. The methods of polymer separation and the percent carboxyl conversion are set forth in Table 3.

TABLE 3

| | Separated Polymer Solids | |
|---|---|---|
| Run # Table 1 | Method of Separation | % Carboxyl Conversion* |
| 1 | M | 85–90 |

TABLE 3-continued

| | Separated Polymer Solids | |
|---|---|---|
| Run # Table 1 | Method of Separation | % Carboxyl Conversion* |
| 3 | M and A | 75–80 |
| 5 | M and A | 85–90 |
| 9 | M and A | 80–90 |
| 9 | 3M | ~90 |
| 10 | M | 35–50 |
| 15 | M | 90–95 |
| 15 | 3M | 95–100 |
| 17 | M | 50–70 |
| 31 | M | 90–95 |
| 32 | 2M | 95–100 |

M-precipitation from large excess of methanol
A-precipitation from large excess of acetone
2M-two precipitation cycles with methanol
3M-three precipitation cycles with methanol
*-estimated conversion based on infrared spectrum analysis and acid titration number.

It is noted that two runs 9 and 18 are included in the table. These illustrate the results obtained with two separate samples taken from Runs 9 and 18. It is further noted that the percent carboxyl conversion ranges from 35% to 100% which illustrates the production of terpolymers of varying carboxyl content and copolymers wherein the carboxyl conversion was 100%.

Example 4

Several additional runs were carried out in which a variety of polyethylene/acrylic acid copolymers were used as the copolymer reactant. In each of the runs, 10 grams of the copolymer was reacted with 5 grams of 2-methylglutaronitrile in 120 grams of an aromatic solvent. The reaction was carried out at a temperature of 240° C. for a period of 24 hours. The total reaction mass after cooling was tested for pour point depression performance in Bombay High South crude. The results of the tests are set forth in Table 4.

TABLE 4

| Run # | Wt % AA | Melt Index | PPD Performance Pour Point °F. | | |
|---|---|---|---|---|---|
| 1 | 19 | 102 | PPM Pour Point | 50 55 | 150 50 |
| 2 | 19 | 316 | PPM Pour Point | 50 50 | 150 45 |
| 3 | 19 | 582 | PPM Pour Point | 50 45 | 150 35 |
| 4 | 25 | 276 | PPM Pour Point | 50 50 | 150 50 |
| 5 | 25 | 112 | PPM Pour Point | 50 65 | 150 60 |
| 6 | 20 | 80 | PPM Pour Point | 50 55 | 150 50 |

It is noted that the melt index of the polyethylene acrylic acid copolymer reactant ranged from 80 to 582. This corresponds nominally to a molecular weight range of about 100,000 to about 15,000. All of the copolymers over this wide range of molecular weight provided reaction masses having good pour point depressant properties, with the better results being obtained with the lower molecular weight copolymers.

While certain embodiments and details have been shown for the purpose of illustrating the present invention, it will be apparent to those skilled in the art that various changes and modifications may be made herein without departing from the spirit or scope of the invention.

We claim:

1. A method for the production of polyolefin/acrylic acid or substituted acrylic acid/acrylonitrile terpolymer, comprising combining a polyolefin/acrylic acid or substituted acrylic acid copolymer with at least one nitrile selected from the group consisting of dinitriles having the formula NC—$C_n$—CN where n=2 to 4 and C is branched or straight chain alkyl to form a mixture and reacting the mixture at a temperature of at least 200° C. for a time sufficient to form polyolefin/acrylic acid or substituted acrylic acid/acrylonitrile terpolymer.

2. The method of claim 1 in which the polyolefin portion of the copolymer is formed from monomers selected from the group consisting of $C_2$ to $C_{20}$ alpha olefins and styrene and styrene derivatives having the formula:

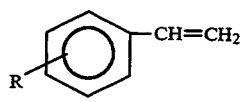

where R=$C_3$, $C_2H_5$, $C_3H_8$, Cl, Br, $COCH_3$ and $OCH_3$ and the acid portion of the copolymer is formed from acids selected from the group having the formula

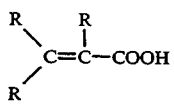

where R=H, phenyl, and $C_1$ to $C_5$ alkyl.

3. The method of claim 2 wherein the mixture is stirred while the reaction occurs in order to shorten reaction time.

4. The method of claim 3 wherein the reaction occurs at a temperature of at least 235° C.

5. The method of claim 4 wherein the reaction is catalyzed by an acid catalyst selected from the group consisting of mineral acids, organic sulfonic acids and organic phosphonic acids.

6. The method of claim 5 wherein the acid catalyst is selected from the group consisting of mineral acids selected from the group consisting of phosphoric acid, hydrochloric acid, phosphorous acid, fluorosulfonic acid and chlorosulfonic acid and organic acids selected from the group consisting of benzene sulfonic acid, methane sulfonic acid, p-toluenesulfonic acid, p(n-dodecylbenzene sulfonic acid, alkyl sulfonic acids having the formula:

where R=$C_1$-$C_{12}$ alkyl groups and alkyl phosphonic acids having the formula:

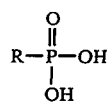

where R=$C_1$-$C_{12}$ alkyl groups and 1-hydroxyethylidene-1,1-diphosphonic acid, amino tri (methylene phosphonic acid) and ethylenediamine tetra (methylene phosphonic acid).

7. The method of claim 6 wherein the polyolefin/acrylic acid or substituted acrylic acid/acrylonitrile terpolymer is recovered from the reaction mass by solvent precipitation.

8. A method for the production of polyethylene/acrylic or substituted acrylic acid/acrylonitrile terpolymer comprising combining a polyethylene/acrylic acid or substituted acrylic acid copolymer with at least one nitrile selected from the group consisting of dinitriles having the formula NC—$C_n$—CN where n=2 to 4 and C is branched or straight chain alkyl in the presence of an inert solvent having a boiling point at atmospheric pressure above the reaction temperature, to form a mixture, and reacting the mixture at atmospheric pressure and a temperature of at least 200° C. for a time sufficient to form polyethylene/acrylic acid or substituted acrylic acid/acrylonitrile terpolymer.

9. The method of claim 8 in which the acid portion of the copolymer is formed from acids selected from the group having the formula

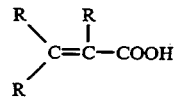

where R=H, phenyl and $C_1$ to $C_5$ alkyl

10. The method of claim 9 wherein the solvent has a boiling point of at least 230° C.

11. The method of claim 9 wherein the reaction is carried out at a temperature of at least 235° C.

12. The method of claim 11 wherein the polyethylene/acrylic acid or substituted acrylic acid copolymer contains at least 20% weight acrylic acid or substituted acrylic acid.

13. The method of claim 12 wherein the reaction time is at least 24 hours.

14. The method of claim 13 wherein the reaction is carried out in the presence of an acid catalyst selected from the group consisting of mineral acids, organic sulfonic acids and organic phosphonic acids.

15. The method of claim 14 wherein the acid catalyst is selected from the group consisting of mineral acids selected from the group consisting of phosphoric acid, hydrochloric acid, phosphorous acid, fluorosulfonic acid and chlorosulfonic acid and organic acids selected from the group consisting of benzene sulfonic acid, methane sulfonic acid, p-toluenesulfonic acid, p(n-dodecylbenzene sulfonic acid, alkane sulfonic acids having the formula:

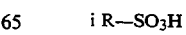

where R=$C_1$-$C_{12}$ alkyl groups and alkyl phosphonic acids having the formula:

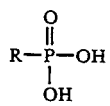

where R=C$_1$-C$_{12}$ alkyl groups and 1-hydroxyethylidene-1,1-diphosphonic acid, amino tri (methylene phosphonic acid) and ethylenediamine tetra (methylene phosphonic acid).

16. A method for the production of polyolefin/acrylonitrile copolymer, comprising combining a polyolefin/acrylic acid or substituted acrylic acid copolymer with at least one nitrile selected from the group consisting of dinitriles having the formula NC—C$_n$—CN where n=2 to 4 and C is branched or straight chain alkyl to form a mixture and reacting the mixture at a temperature of at least 200° C. for a time sufficient to form polyolefin/acrylonitrile copolymer.

17. The method of claim 16 wherein the polyolefin portion of the copolymer is formed from monomers selected from the group consisting of C$_2$ to C$_{20}$ alpha olefins and styrene and styrene derivatives having the formula

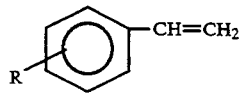

where R=CH$_3$, C$_2$H$_5$, C$_2$H$_8$, Cl, Br, CO$_2$CH$_3$ and OCH$_3$ and the acid portion of the copolymer is formed from acids selected from the group having the formula

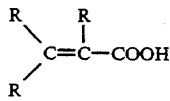

where R=H, phenyl, and C$_1$ to C$_5$ alkyl

18. The method of claim 17 wherein the reaction is carried out for a sufficient time to react substantially all of the polyolefin/acrylic acid or substituted acrylic acid copolymer with the dinitrile.

19. The method of claim 18 wherein the mixture is stirred while the reaction occurs in order to shorten reaction time.

20. The method of claim 19 wherein the reaction occurs at a temperature of at least 225° C.

21. The method of claim 20 wherein the reaction is catalyzed by an acid catalyst selected from the group consisting of mineral acids, organic sulfonic acids and organic phosphonic acids.

22. The method of claim 21 wherein the acid catalyst is selected from the group consisting of mineral acids selected from the group consisting of phosphoric acid, hydrochloric acid, phosphorous acid, fluorosulfonic acid and chlorosulfonic acid and organic acids selected from the group consisting of benzene sulfonic acid, methane sulfonic acid, p-toluenesulfonic acid, p(n-dodecylbenzene sulfonic acid, alkane sulfonic acids having the formula:

where R=C$_1$-C$_{12}$ alkyl groups and alkyl phosphoric acids having the formula:

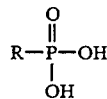

where R=C$_1$-C$_{12}$ alkyl groups and 1-hydroxyethylidene-1,1-diphosphonic acid, amino tri (methylene phosphoric acid) and ethylenediamine tetra (methylene phosphoric acid).

23. The method of claim 22 wherein the polyolefin/acrylonitrile copolymer is recovered from the reaction mass by solvent precipitation.

24. A method for the production of polyethylene/acrylonitrile copolymer, comprising combining a polyethylene/acrylic acid copolymer with at least one dinitrile selected from the group consisting of dinitriles having the formula NC—C$_n$—CN where n=2 to 4 and C is branched or straight chain alkyl in at least a 1:1 stoichiometric ratio in the presence of an inert solvent having a boiling point at atmospheric pressure above the reaction temperature, to form a mixture, and reacting the mixture at atmospheric pressure and a temperature of at least 200° C. for a time sufficient to form polyethylene/acrylonitrile copolymer.

25. The method of claim 24 wherein the solvent is an aromatic solvent having a boiling point of at least 230° C.

26. The method of claim 24 wherein the reaction is carried out at a temperature of at least 235° C.

27. The method of claim 26 wherein the polyethylene/acrylic acid copolymer contains at least 20% by weight acrylic acid.

28. The method of claim 27 wherein the reaction time is at least 24 hours.

29. The method of claim 28 wherein the reaction is carried out in the presence of an acid catalyst selected from the group consisting of mineral acids, organic sulfonic acids and organic phosphonic acids.

30. The method of claim 29 wherein the acid catalyst is selected from the group consisting of mineral acids selected from the group consisting of phosphoric acid, hydrochloric acid, phosphorous acid, fluorosulfonic acid and chlorosulfonic acid and organic acids selected from the group consisting of benzene sulfonic acid, methane sulfonic acid, p-toluenesulfonic acid, p(n-dodecylbenzene sulfonic acid, alkane sulfonic acids having the formula:

where R=C$_1$-C$_{12}$ alkyl groups and alkyl phosphonic acids having the formula:

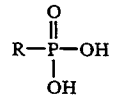

where R=C$_1$-C$_{12}$ alkyl groups and 1-hydroxyethylidene-1,1-diphosphonic acid, amino tri (methylene phosphonic acid) and ethylenediamine tetra (methylene phosphonic acid).

31. The method of claim 1 in which the entire reaction mass is recovered and added to heavy hydrocarbon oil.

32. The method of claim 8 in which the entire reaction mass is recovered and added to heavy hydrocarbon oil.

33. The method of claim 16 in which the entire reaction mass is recovered and added to heavy hydrocarbon oil.

34. The method of claim 24 in which the entire reaction mass is recovered and added to heavy hydrocarbon oil.

35. A pour point depressant composition comprising a total reaction mass obtained by reacting the polyolefin/acrylic acid or substituted acrylic acid copolymer having a molecular weight of at least 2,000 with at least one nitrile selected from the group consisting of dinitriles having the formula $NC-C_n-CN$ where $n=2$ to 4 and C is branched or straight chain alkyl to form a mixture and reacting the mixture at a temperature of at least 200° C. for a time sufficient to form a reaction product comprising polyolefin/acrylic acid or substituted acrylic acid/acrylonitrile terpolymer, cyclic imide and any unreacted dinitrile.

36. A pour point depressant composition comprising the total reaction mass obtained by reacting a polyethylene/acrylic acid or substituted acrylic acid copolymer having a molecular weight of at least 2,000 with at least one nitrile selected from the group consisting of dinitriles having the formula $NC-C_n-CN$ where $n=2$ to 4 and C is branched or straight chained alkyl in the present of an inert solvent having a boiling point at atmospheric pressure above the reaction temperature to form a mixture and reacting the mixture at atmospheric pressure and a temperature of at least 200° C. for a time sufficient form a reaction product comprising polyethylene/acrylic acid or substituted acrylic acid/acrylonitrile terpolymer, cyclic imide, solvent and any unreacted nitrile.

* * * * *

UNITED STATES PATENT AND TRADEMARK OFFICE
CERTIFICATE OF CORRECTION

PATENT NO.:     5,405,916

DATED:          April 11, 1995

INVENTOR(S):    Kenneth W. Pober and Charles M. Starks

It is certified that error appears in the above-identified patent and that said Letters Patent is hereby corrected as shown below:

Columns 5-6,
Table 1, Run #5, second line, "Pour Pt. 75 65" should be
    --Pour Pt. 65 50--.

Table 1, Run #6, second line, "2.4" should be --2.4g--.

Table 1, Run #14, first line, "90g" should be --120g--.
Columns 7-8,
Table 1, Run #25, first line, "120g" should be --480g--; and
    second line, "Pour Pt. 45" should be --Pour Pt. 50 45--.

Column 11, Claim 2, line 36, "R = C$_3$" should be --R = CH$_3$--.

Column 12, Claim 15, line 65, "iR - SO$_3$H" should be --R - SO$_3$H--.

Signed and Sealed this

Twenty-seventh Day of June, 1995

Attest:

BRUCE LEHMAN

*Attesting Officer*     *Commissioner of Patents and Trademarks*